United States Patent
Moon et al.

(10) Patent No.: US 6,385,662 B1
(45) Date of Patent: *May 7, 2002

(54) METHOD OF PROCESSING INFORMATION USING A PERSONAL COMMUNICATION ASSISTANT

(75) Inventors: Billy Gayle Moon, Apex; Brian Bankler; Manon Ann Baratt, both of Cary, all of NC (US)

(73) Assignee: Ericsson Inc., Research Triangle Park, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/943,708

(22) Filed: Oct. 3, 1997

(51) Int. Cl.[7] .............................. G06F 11/32; G06F 3/00
(52) U.S. Cl. ........................................ 709/318; 709/864
(58) Field of Search ................................ 709/300, 318; 345/346, 347, 779, 864; 379/100.06

(56) References Cited

U.S. PATENT DOCUMENTS

| | | | | |
|---|---|---|---|---|
| 4,646,346 A | * | 2/1987 | Emerson et al. | 379/214 |
| 5,452,289 A | * | 9/1995 | Sharma et al. | 370/32.1 |
| 5,579,472 A | * | 11/1996 | Keyworth, II et al. | 395/326 |
| 5,617,526 A | * | 4/1997 | Oran et al. | 395/326 |
| 5,705,995 A | * | 1/1998 | Laflin et al. | 340/825.44 |
| 5,721,825 A | * | 2/1998 | Lawson et al. | 395/200.33 |
| 5,838,252 A | * | 11/1998 | Kikinis | 340/825.44 |
| 5,949,326 A | * | 9/1999 | Wicks et al. | 340/286.01 |
| 6,008,810 A | * | 12/1999 | Bertram et al. | 345/347 |
| 6,092,067 A | * | 7/2000 | Girling et al. | 707/100 |
| 6,148,213 A | * | 11/2000 | Bertocci et al. | 455/462 |
| 6,211,858 B1 | * | 4/2001 | Moon et al. | 345/146 |
| 6,285,364 B1 | * | 9/2001 | Giordano, III et al. | 345/347 |

OTHER PUBLICATIONS

Minasi, Mark. "Mastering Windows NT Workstation 4", Sep. 1996.*
(Boney) Boney, Karissa. "The Race is On" p. 32–38, Jun. 1997.*
(Brodsky) Brodsky, Ira. "PDAs will usher in the next net revolution", Nov. 7, 1994.*
Blodgett, Mindy. "Mobile users eye smart phones", Feb. 24, 1997.*
Edge. "New cellular phone: Nokia 100 portable cellular phone for first time buyers", Oct. 18, 1993.*
Sprint. "Sprint PCS User Guide" Jul. 1997.*

* cited by examiner

*Primary Examiner*—St. John Courtenay, III
*Assistant Examiner*—Lewis A Bullock, Jr.
(74) *Attorney, Agent, or Firm*—Myers Bigel Sibley & Sajovec

(57) ABSTRACT

A method for processing information using a personal digital assistant utilizes a standardized status bar manager ("SBM") and status bar interfaces. All applications and the operating system's launch pad support the status bar which can be uniformly used to both show and interact with status bar messages. The SBM links together all of the status bar areas of all applications (and the operating system launch pad as well) whenever necessary. The present invention routes global status messages corresponding to incoming events to each status bar of every active application. The SBM also routes all messages to the status bar, regardless whether the message requires an action by the user or is for information only. Minimized applications are displayed on and launched from a status bar of an active application without having to first access the operating system launch pad. Finally, the SBM creates an unanswered telephone call list that includes a reason code explaining why the call went unanswered.

22 Claims, 4 Drawing Sheets

METHOD OF PROCESSING INFORMATION USING A PERSONAL COMMUNICATION ASSISTANT

BACKGROUND

In today's fast-paced business world, there is a need for a smaller, faster, more capable business tool which incorporates a powerful computer with integrated communications capabilities. A personal communication assistant ("PCA") having those features would greatly enhance the efficiency of a person who travels frequently, needs the portable power of a notebook PC (for tasks such as word processing, database or spreadsheet management, etc.), and also needs the ability to communicate "on the go" using a variety of media.

In the past, personal digital assistants ("PDA's") have been used as electronic schedulers, address books, and related functions, but only recently have "new" PCA's been available with integrated communications capabilities. New PCA's can come equipped with features such as telephone, e-mail, and fax capabilities, as well as Internet access and built-in Web browsers. Of course, the addition of several new functions to the "old" PDA translates into the need for more information to be displayed on a screen that is fairly limited in useable surface area.

One significant problem with a device that integrates a variety of communication features such as a PCA is that the user may be interrupted by a regular stream of non-sequential events such as e-mail, telephone calls, warnings from the system, etc. The traditional method of announcing such events is to display a message informing the user of the event and then require the user to take immediate action in response to the event. This is accomplished through a modal dialog box, also known as a "pop-up box." As an event is received by the system, a pop-up box is displayed on the screen. The user must then stop work because a pop-up box requires that an option button within the box be selected before the user can return to the task at hand. However, it may be inconvenient for the user to interrupt work at that particular point in time; rather, the user would prefer to postpone action in response to the event until a more convenient time.

In existing systems, the user must select the proper option from the pop-up box (usually a "cancel" button) to postpone action in response to the event. Later, when the user wants to respond to the event, he or she must correctly remember it and must also know the appropriate action to take once the event is retrieved. This could lead to errors by the user. First, if responses to a number of events were postponed, the user may not remember each and every one. For example, if the user was interrupted by and then postponed responses to an incoming telephone call, an e-mail message, and a calendar reminder, he or she may not remember each event or the appropriate action to be taken in response to each of the three. Second, if the user delays taking action in response to a non-routine notification from the system, e.g., the expiration of a software license or notification of low hard disk space, the computer prompting of response options will be lost with the closing of the pop-up box; he or she may then not know how to respond to the previous notification.

In short, no central repository exists in existing devices for tracking ongoing events and the appropriate responses to those events so that the user can later access a log of what has occurred and retrieve the computer-generated response options. Currently, several programs can create a log of actions and events, but each of such logs are program-specific. That is, an e-mail program will create a log of received messages but the e-mail program must first be initiated before the log is displayed. If the active application is one other than the e-mail program (for example, a word processing program) the active application will not have access to the log, forcing the user to minimize the word processing program and then to initiate the e-mail program to gain access to the e-mail log.

There is another problem associated with the known pop-up box.

Messages can be divided into two categories: "less important" messages and "more important" messages. Less important messages typically are those which are either "for information only" or those that require a user response but are considered a low priority. More important messages are those that require a response from the user before he or she can continue the task at hand. Less important messages are usually sent to the status bar and require the user to determine which action to take, if any, and how to launch it. More important messages are displayed as pop-up boxes which have codes associated with them so that the proper action is launched upon selecting the response in the pop-up box. In the past, it was the programmer who decided how messages were categorized. It is not difficult to imagine that a programmer's decision regarding the classification of messages will not always agree with a user's idea of a proper classification.

Another inherent drawback to current devices is that they have a relatively small display which has insufficient space to support the use of a "start bar" or similar device. Desktop PC's and even notebook computers typically have relatively large, high resolution displays. As a result, showing a multiple window environment with an area reserved for a "start bar" such as the one used by Windows 95® is practical. Unfortunately, this is not possible with a PCA: there, the active application occupies the entire screen. While performing a task in one application, the user may wish to access another application which had been previously minimized, or the user may not even remember if any applications were minimized at all. Accordingly, the user is forced to minimize the active application and then check the status area of the launch pad for the application desired.

Finally, most existing devices which have the capability to receive telephone calls, including PCA's, also have the capacity to store unanswered calls. The user may later retrieve information about the missed calls such as date, time, telephone number, etc., so that the call can be returned. One piece of information that would be particularly useful to a PCA user is a reason that the call was missed in the first place, e.g., busy, refused, etc. Existing methods of storing unanswered call information do not provide this type of information. One of the existing ways to obtain call information is to retrieve the unanswered calls from the switch. However, the switch does not store a reason code for the missed call.

From the foregoing, it can be seen that the need exists for an improved PCA which allows a status message corresponding to an asynchronous event received by the PCA to be viewed in any application environment, allows a user to act upon any status message sent to the status bar, allows minimized applications to be launched from the status bar, and provides a user with an unanswered call log which contains information about why the call was missed.

SUMMARY OF THE INVENTION

The present invention includes a method of processing information with a PCA or like device using a standardized status bar manager ("SBM") and status bar interfaces. All applications and the operating system's launch pad support the status bar which can be used uniformly to both show and interact with status bar messages. In other words, the SBM links together all of the status bar areas of all applications (and the operating system launch pad as well) whenever necessary.

The method of the present invention using the SBM and its related interfaces also resolves the problem related to the PCA's receipt of non-sequential events. When the system receives a routine event, notification of that event is routed to the pertinent application and displayed on the status bar of that application. However, if the system receives an event important enough to alert the user immediately, notification of the event and all of its associated information are sent to the SBM which then routes the appropriate information to the status bars of all currently running applications, including those which are minimized. The user then has the option of responding immediately to the message notification or postponing action by simply ignoring the message. At a later time when it is more convenient, the user may then access a status bar history file to retrieve the previously received events. By selecting an event from the status bar history log, the user also automatically implements the action code associated with the event, thus relieving the user of the need to remember the programs and options available.

The problem of division of messages into two categories ("less important" and "more important") is solved simply by the elimination of the two categories. The present invention totally eliminates the use of the pop-up box and routes all messages with their associated event actions to the status bar where the user has the option of responding immediately or postponing action until a more convenient time.

The minimization problem discussed above is solved with the SBM of the present invention by allowing the user to launch any minimized application from the active application. The SBM creates a launch icon for each minimized application and then displays the icon in the message area of the active application, regardless of which application is active The user may then launch any minimized application simply by selecting the appropriate launch button in the message area of the active application, thus saving time and effort.

Another feature of the present invention includes the creation of an unanswered telephone call list which, among other things, contains a field which displays the reason that the received call went unanswered. The call list can be accessed by two methods. First, the user can access the status bar history file in the normal manner and one item that corresponds to a telephone call. Second, the user can open the phone dialer application and then select the unanswered call list from the menu.

For a further understanding of the present invention and the objects thereof, attention is directed to the drawings and to the following brief descriptions thereof, to the Detailed Description, and to the appended claims.

DETAILED DESCRIPTION

Figure 1:
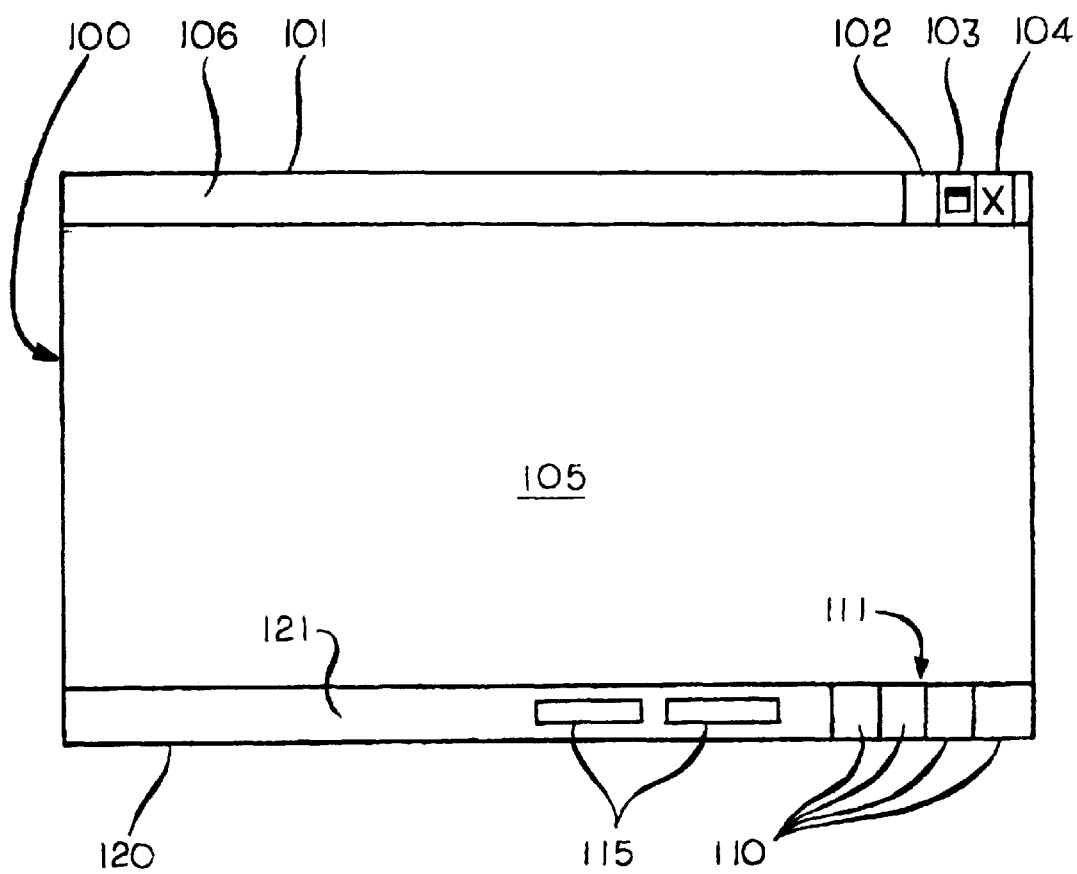
FIG. 1 is a plan view of a display screen layout of a PCA of the present invention.

A typical layout of a display screen 100 of a PCA (not shown) is represented in FIG. 1. One major component of the screen 100 is a display area 105. The display area 105 is rectangular and occupies the majority of the surface area of the screen, as shown, to display the text and/or graphics of the active application. A title bar 101 is an elongate, generally horizontal area located above the display area 105 and usually extends across the entire width of the screen 100. It is used to display the name of the active application, usually in a title area 106 within the left portion of the title bar 101. Also within the title bar 101, usually near the right edge, are three buttons: a minimize button 102, a maximize button 103, and an exit button 104. The functions of these three buttons 102, 103, and 104 are standard features and are well-known in the art of computer software. The screen 100 also includes a status bar 120. In the preferred embodiment, the status bar 120 is similar in shape to the title bar 101 but is located at the bottom edge of the screen 100 below the display area 105 as shown. Within the status bar 120 are a status message area 121 and application launch buttons 115, the details of which will be discussed in detail below. The status bar 120 is normally generated for each application as well as for the launch pad. Adjacent to the status bar 120 is a mode panel 111 which contains mode option buttons 110. The mode option buttons 110 are used to control the manner in which items displayed on the screen 105 are selected.

Figure 2:
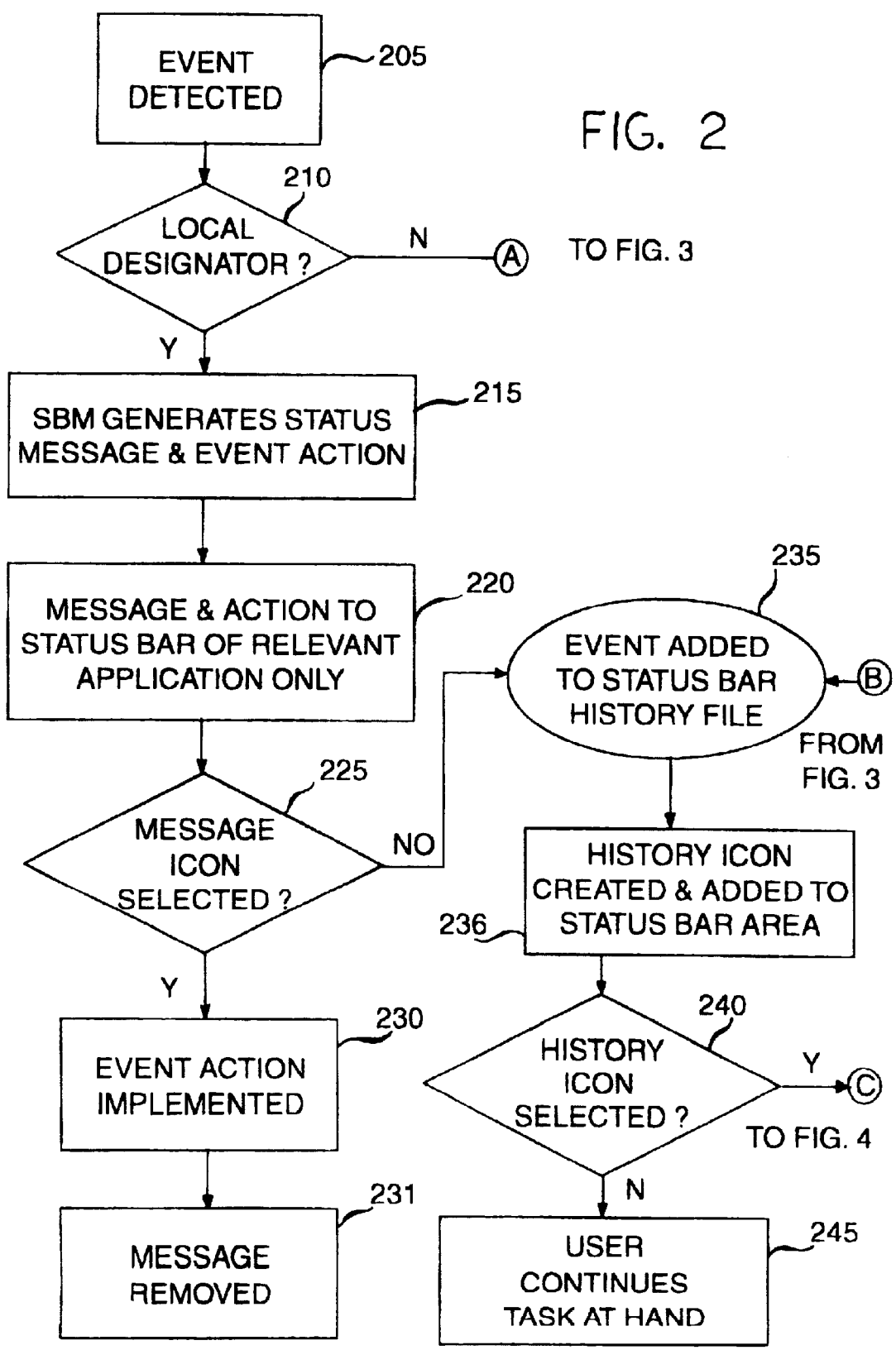
FIG. 2 is a flow chart illustrating the method used by the present invention for processing a local event.

Now referring to FIG. 2: when the PCA (not shown) detects an event such as an incoming e-mail message or system notification 205, the operating system first examines the nature of the event to determine if it is designated as "local" 210. A local event is one which will be routed to the applicable application only, as opposed to "global" events which will be routed to all active applications, as discussed further herein. In the preferred embodiment, the default setting for event designation is "global." Only those events specially designated by an application developer or other software programmer as "local" will be handled accordingly; events having no designation will be handled as global events. It is obvious, however, that the default setting for event designation could just as easily be "local" with global events needing special designators to be handled as such. Alternatively, an event can be designated as "special" where its corresponding message and the associated event action could be sent to the status bars of a certain number of specified applications, as opposed to just one (local) or all (global).

Figure 4:
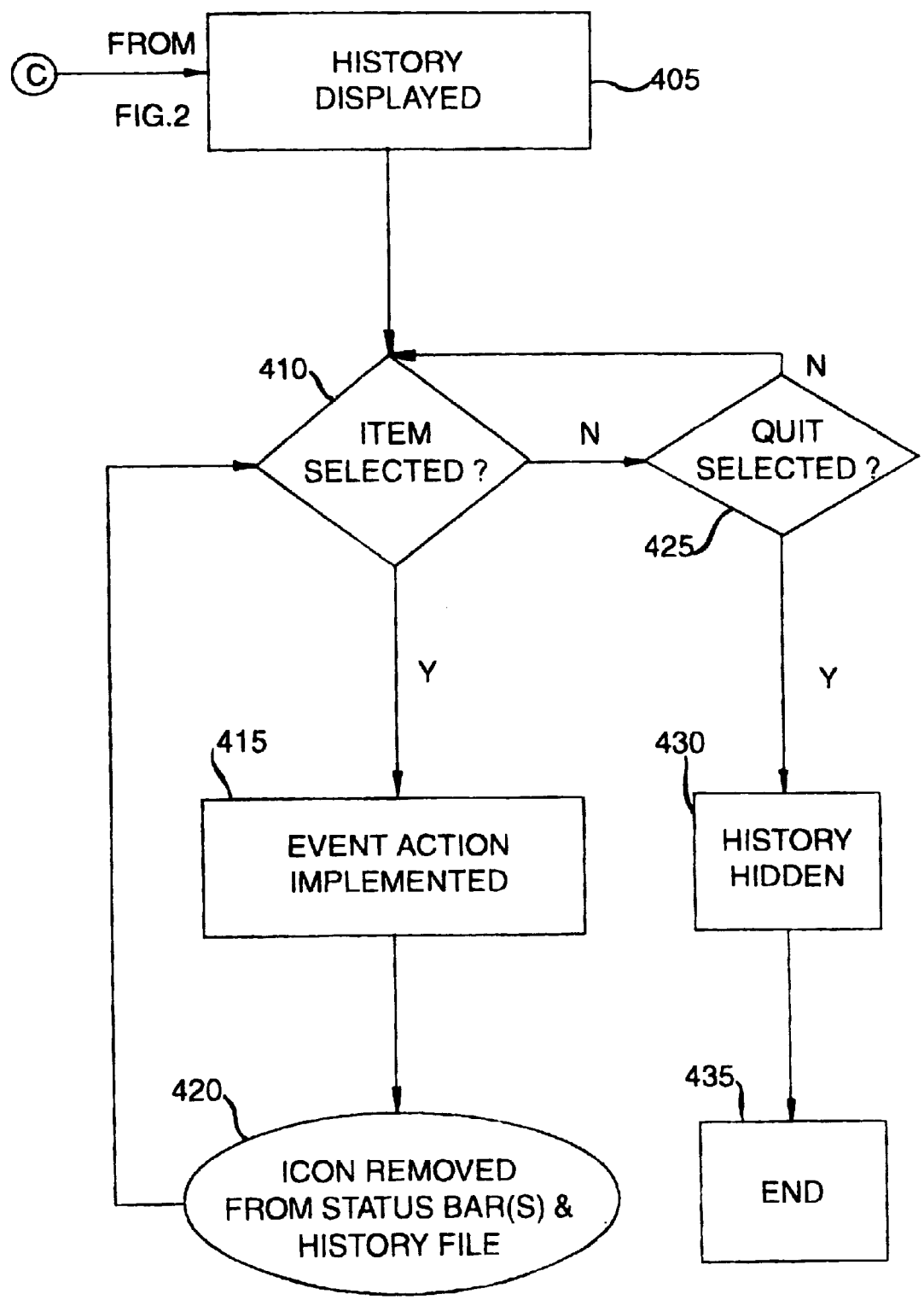
FIG. 4 is a flow chart illustrating of the method used by the present invention for accessing a status bar history file.

If the event is designated as local, the SBM ("SBM") generates a status message and an associated event action 215, if required. An event action is the computer code necessary to carry out a proper response to the event. For example, if the event is an incoming e-mail message, the event action would be the code needed to initiate the e-mail program and access the e-mail message. The status message is then routed to the pertinent application 220. The status message which is sent to the message area 121 of the status bar 120 may be a text message, a message icon, or any combination of items of the format capable of being received by the message area 121. If the user is running the applicable application, and the message icon is selected, the event action is implemented 230 and the message icon is then removed from the relevant status bar 231. However, if an interruption would be inconvenient and the user chooses to ignore the message icon, the event and the event action are added to a status bar history file 235. After a fixed time period elapses, the message icon then disappears and a history icon is created 236 within the message area 121 of the status bar 120. In the preferred embodiment, the history icon is an arrow pointing in the upward direction, but can be any image chosen by the application developer. As long as the user continues to ignore the history icon, the history file remains hidden, allowing the user to continue the task at hand uninterrupted 245. When the user later wishes to respond to the event, the history icon can be selected 240 and the history file is accessed 405 as shown in FIG. 4. Of course, if the user chooses to exit the pertinent application, the history icon disappears (not shown) because the event was designated as local and therefore shown only when the applicable application was running.

Figure 3:
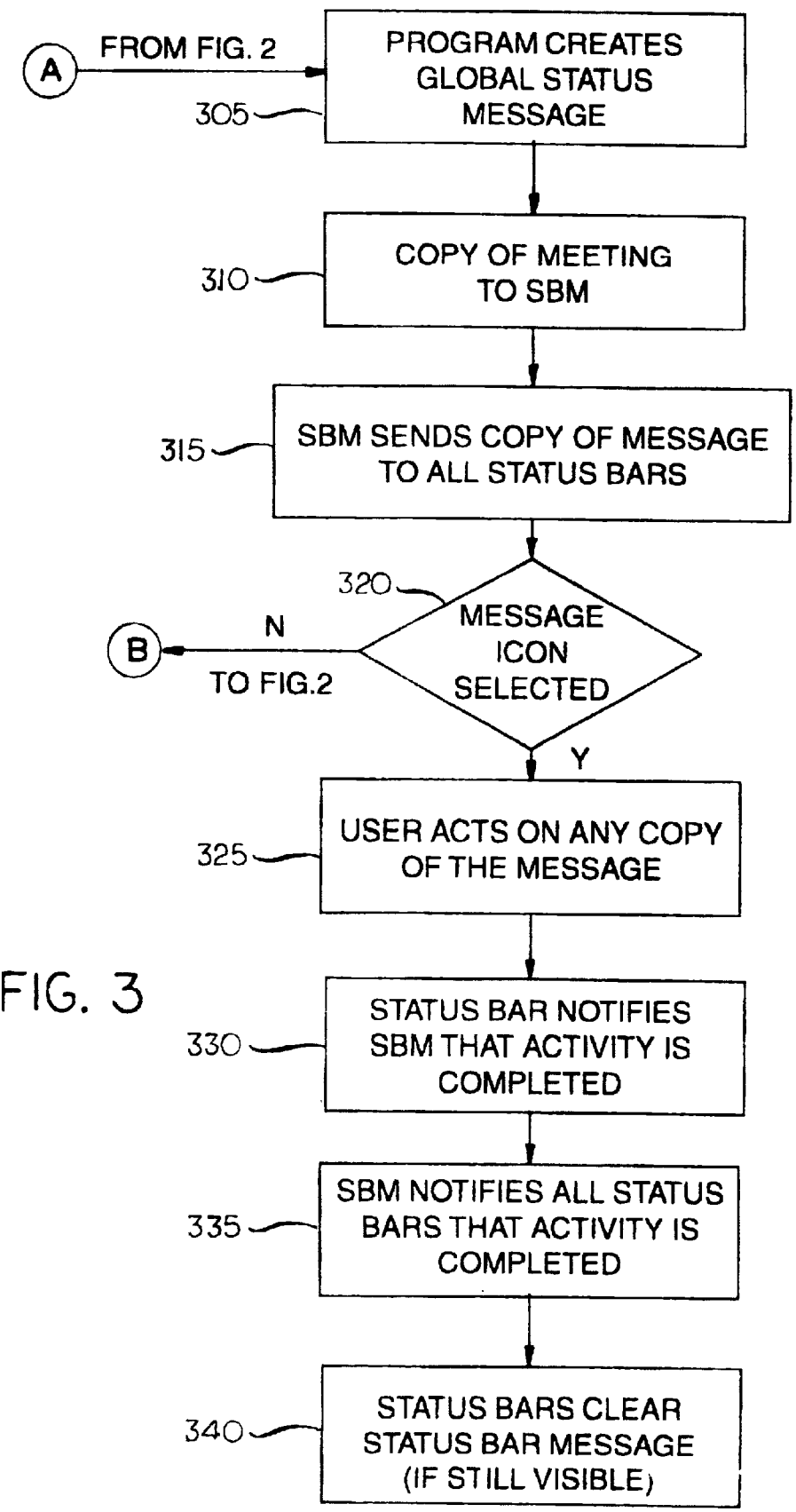
FIG. 3 is a flow chart illustrating the method used by the present invention for processing a global event.

If the event detected by the system of the preferred embodiment was not designated as local, the event is treated as a global event by default. Referring now to FIG. 3, the operating system creates a global status message and associated event action 305 which are then transferred to the SBM 310. The SBM causes a message to be sent to the status bar area of every application 315. The remaining process is very similar to the handling of the local message previously described herein. If the user chooses to ignore the message, he or she continues to work uninterrupted and the event is added to the status bar history file 235 and a history icon is created 236 as shown in FIG. 2, to be retrieved at a more convenient time. If the user, however, selects the message when it appears in the status bar 320, the event action is implemented 325 and the status bar transmits a signal to notify the SBM that the action is complete 330. The SBM then notifies the status bars of the other applications (those currently not running) that the action is complete 335 and all of the messages are removed 340. Of course, if the user exits one application and initiates another, notification of the event is not lost because a global event creates messages and/or history icons for the status bars of all applications in the PCA.

If a user ignores a message in either the local or global event scenario, the event is recorded to a status bar history file 235 as shown in FIG. 2. When the user is ready to respond to one or more events which were previously ignored, the history icon is selected 240, the status bar history file is accessed, and the event log is displayed 405, shown in FIG. 4. The event log contains relevant information regarding the event, including event type date, time, telephone number (if applicable), and the like. If the user selects an event from the event log 410 then the event action associated with the selected event is implemented 415. Once the user's response to the event is complete, the history icon is removed from the status bars and the event is deleted from the status bar history file 420. If the user does not select an event, then the "quit" button must be chosen 425, which causes the history file to be hidden 430 and allows the user to return to the current application 435.

In solving the problem created by the division of status messages into the two categories previously discussed, the present invention eliminates the division entirely and treats all messages as equally important. For example, the operating system may recognize that the PCA's flash drive is getting low on available flash space. The system handles the situation as it would any event, as shown in FIGS. 2–4. The status message warning the user of the situation would be routed to the message area 121 of the status bar 120 of the active application (if the event was considered a local one) or to the message area 121 of the status bar 120 of the active application as well as all minimized applications (if the event was considered a global one). The user can then respond to the status message by selecting the appropriate area of the status bar 120, or can postpone responding by ignoring the message.

If a user decides to minimize an active application, he or she selects the minimize button 102 just as he or she would in any computer application (selection can be accomplished by using a mouse, carrying out a series of keystrokes, touching the screen, voice command, or any other known input method). However, instead of the icon for the minimized application being displayed on the launch pad (not shown), the SBM creates an application launch button 115 on the status bar 120 of the active application as well as on the status bar 120 of every other application, thus allowing the user to maximize any minimized application from the active application without first returning to the system launch pad.

Finally, the present method includes an improved unanswered telephone call list. An incoming telephone call is handled as any other event, as shown in FIGS. 2–4. It may be designated as a local event but is normally treated as a global event in the preferred embodiment of the present invention. If the call goes unanswered, the message icon is removed from the message area of the status bar and a history icon is created 236. The user can then later select the history icon 240 as shown in FIG. 2. When the history icon is selected 240, the user can select the unanswered call from the status bar history file.

Alternatively, the user may open the phone dialer application and directly select the unanswered call list from the phone dialer menu. The dialer application obtains the desired information from the status bar manager and then displays the unanswered call to the user. By selecting the unanswered call, the user may then implement the event action associated with the call, e.g., the dialing of a return call.

Although the best mode contemplated by the inventors for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

We claim as an invention:

1. A method of operating a personal communications device that is operative to execute a plurality of applications that generate graphical information on a display of the personal communications device, the method comprising:

executing an application to generate an application-specific display field on the display;

concurrent with continuing execution of application to generate the application-specific display field and responsive to detection of a communications event, displaying a status message indicator indicative of the communications event in a status display field of the application-specific display field;

determining whether a user graphically selects the displayed status message indicator within a predetermined time interval; and responsive to the user failing to graphically select the displayed status message indicator within the predetermined time interval, performing the following actions:

terminating display of the status message indicator in the status display field;

displaying a history icon in the status display field; and creating a record in a history file, the record corresponding to the communications event and linked to the history icon.

2. A method according to claim 1, further comprising displaying an event log including information from the record in the history file responsive to a user graphically selecting the displayed history icon.

3. A method according to claim 2, further comprising executing an event action associated with the communications event responsive to a user graphically selecting an item in the event log.

4. A method according to claim 3, wherein the communications event comprises a telephone call, wherein the event log comprises a list including information regarding at least one unanswered telephone call, and wherein executing an event action comprises dialing a telephone number associated with the communications event.

5. A method according to claim 2, further comprising performing the following actions responsive to a user graphically selecting an item in the event log:
- executing an event action associated with the communications event;
- terminating display of the history icon; and
- removing the history file record associated with the communications event from the history file.

6. A method according to claim 1, wherein displaying a status message indicator in a status display field is preceded by:
- detecting a communications event; and
- determining which of the plurality of applications is pertinent to the detected communications event.

7. A method according to claim 6:
- wherein determining which of the plurality of applications is pertinent to the detected communications event comprises determining that the executing application is pertinent to the detected communications event; and
- wherein displaying a status message indicator indicative of the communications event in a status display field of the application-specific display field comprises displaying the status message indicator indicative of the communications event in the status display field responsive to the determination that the executing application is pertinent to the detected communications event.

8. A method according to claim 6, further comprising:
- terminating execution of the application to terminate generation of the application-specific display field and the status display field;
- executing a new application to generate a new application-specific display field including a new status display field; and
- concurrent with continuing execution of the new application to generate the new application-specific display field and responsive to determination that the new application is pertinent to the communications event, displaying a history icon linked to the record in the history file associated with the communications event in the new status display field.

9. A method according to claim 6, further comprising:
- terminating execution of the application to terminate generation of the application-specific display field and the status display field associated therewith;
- executing a new application to generate a new application-specific display field including a new status display field; and
- concurrent with continuing execution of the new application to generate the new application-specific display field and responsive to determination that the new application is not pertinent to the communications event, foregoing display of a history icon linked to the record in the history file associated with the communications event in the new status display field.

10. A method according to claim 6, wherein determining which of the plurality of applications is pertinent to the detected communications event comprises determining whether the communications event is a global event or a local event.

11. A method according to claim 1, wherein the application-specific display field comprises a display screen including a generally rectilinear display area and an elongate bar-like display area disposed adjacent the generally rectilinear display area, and wherein the status display field in disposed in the elongate bar-like display area.

12. A personal communications device, comprising:
- graphical display;
- means for executing an application to generate an application-specific display field on the display;
- means for displaying a status message indicator indicative of the communications event in a status display field of the application-specific display field concurrent with continuing execution of application to generate the application-specific display field and responsive to detection of a communications event;
- means for determining whether a user graphically selects the displayed status message indicator within a predetermined time interval; and
- means performing the following actions responsive to the user failing to graphically select the displayed status message indicator within the predetermined time interval:
  - terminating display of the status message indicator in the status display field;
  - displaying a history icon in the status display field; and
  - creating a record in a history file, the record corresponding to the communications event and linked to the history icon.

13. A device according to claim 12, further comprising means for displaying an event log including information from the record in the history file responsive to a user graphically selecting the displayed history icon.

14. A device according to claim 13, further comprising means for executing an event action associated with the communications event responsive to a user graphically selecting an item in the event log.

15. A device according to claim 14, wherein the communications event comprises a telephone call, wherein the event log comprises a list including information regarding at least one unanswered telephone call, and wherein the means for executing an event action comprises means for dialing a telephone number associated with the communications event.

16. A device according to claim 13, further comprising means for performing the following actions responsive to a user graphically selecting an item in the event log:
- executing an event action associated with the communications event;
- terminating display of the history icon; and
- removing the history file record associated with the communications event from the history file.

17. A device according to claim 12, further comprising:
- means for detecting a communications event; and
- means for determining which of the plurality of applications is pertinent to the detected communications event.

18. A device according to claim 17:

wherein the means for determining which of the plurality of applications is pertinent to the detected communications event comprises means for determining that the executing application is pertinent to the detected communications event; and wherein the means for displaying a status message indicator indicative of the communications event in a status display field of the application-specific display field comprises means for displaying the status message indicator indicative of the communications event in the status display field responsive to the determination that the executing application is pertinent to the detected communications event.

19. A device according to claim 17, further comprising:

means for terminating execution of the application to terminate generation of the application-specific display field and the status display field;

means for executing a new application to generate a new application-specific display field including a new status display field; and means for displaying a history icon linked to the record in the history file associated with the communications event in the new status display field concurrent with continuing execution of the new application to generate the new application-specific display field and responsive to determination that the new application is pertinent to the communications event.

20. A device according to claim 17, further comprising:

means for terminating execution of the application to terminate generation of the application-specific display field and the status display field associated therewith;

means for executing a new application to generate a new application-specific display field including a new status display field; and means for foregoing display of a history icon linked to the record in the history file associated with the communications event in the new status display field concurrent with continuing execution of the new application to generate the new application-specific display field and responsive to determination that the new application is not pertinent to the communications event.

21. A device according to claim 17, herein the means for determining which of the plurality of applications is pertinent to the detected communications event comprises means for determining whether the communications event is a global event or a local event.

22. A device according to claim 12, wherein the application-specific display field comprises a display screen including a generally rectilinear display area and an elongate bar-like display area disposed adjacent the generally rectilinear display area, and wherein the status display field in disposed in the elongate bar-like display area.

* * * * *